Figures 1, 2, 3, 4:
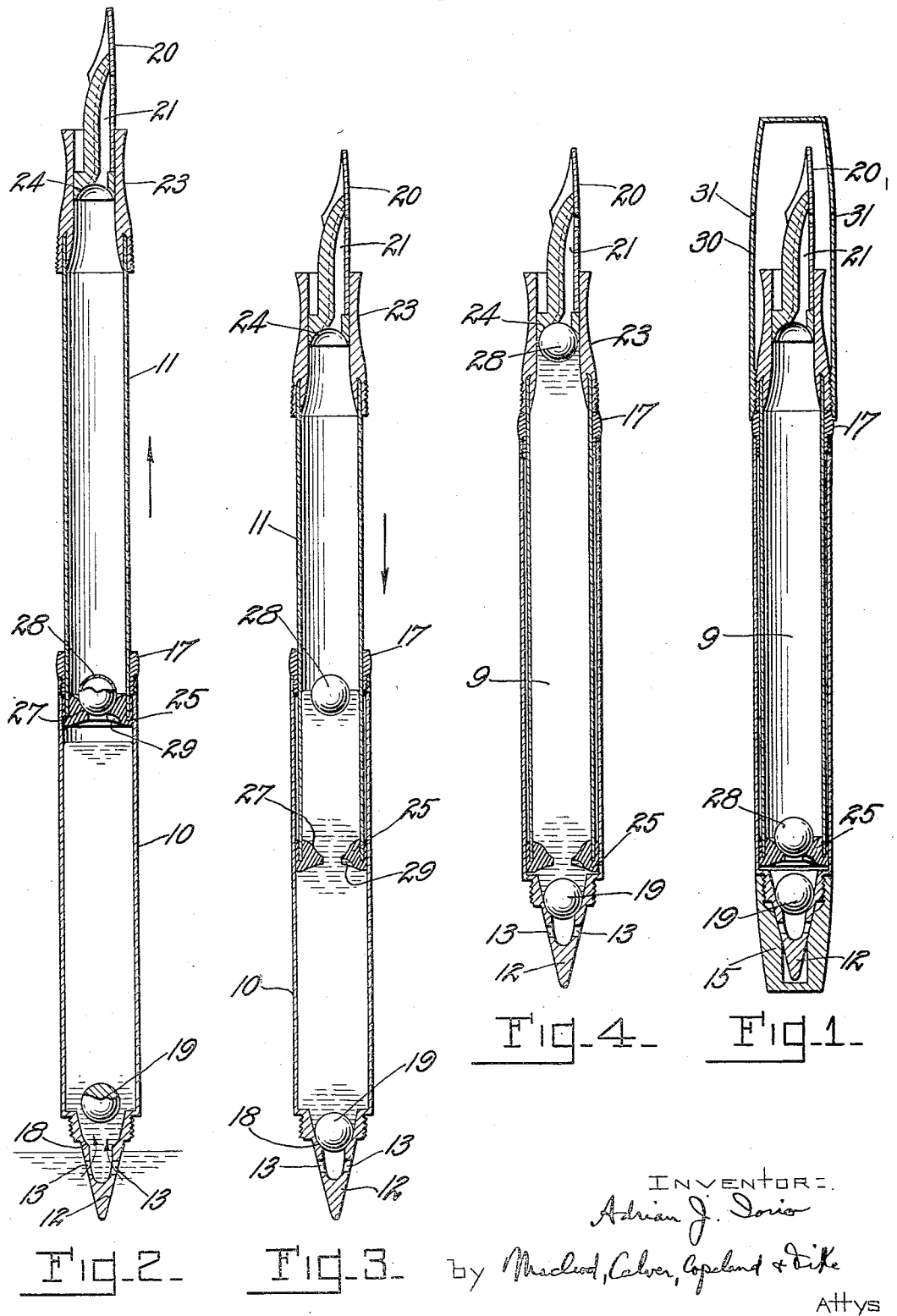

March 21, 1933.   A. J. IORIO   1,901,971

FOUNTAIN PEN

Filed Sept. 25, 1931

INVENTOR:
Adrian J. Iorio
by Macleod, Calver, Copeland & Dike
Attys

Patented Mar. 21, 1933

1,901,971

UNITED STATES PATENT OFFICE

ADRIAN J. IORIO, OF RANDOLPH, MASSACHUSETTS

FOUNTAIN PEN

Application filed September 25, 1931. Serial No. 565,080.

This invention relates to fountain pens and more particularly to self-filling fountain pens.

It is an object of the invention to provide a durable, reliable, self-filling fountain pen of long life which can be manufactured at low cost.

It is another object of the invention to provide a self-filling pen which can be filled conveniently even when the ink level in the supply bottle or other receptacle is extremely low.

It is a further object of the invention to provide a self-filling pen of maximum ink capacity for a given size.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawing: in which, Fig. 1 is a sectional elevational view of a pen embodying the invention showing the pen empty;

Figs. 2 and 3 are sectional elevational views of the pen showing the relation of the parts in two different positions during the operation of filling the pen; and Fig. 4 is a similar view showing the pen filled.

One embodiment of the invention is illustrated in the accompanying drawing and comprises a pen having a body portion comprising hollow telescoping cylinders 10 and 11 providing an ink reservoir 9. The outer cylinder 10 is provided with a reduced outer end portion 12 having inlet openings 13 communicating with the interior of the cylinder. A cap 15 is threaded upon the end of the cylinder so as to engage the end portion 12 and close the inlet openings 13. A knurled bushing 17 is threaded upon the inner end of the cylinder 10 and closes the space between the same and the inner cylinder 11. The end portion 12 is provided with a valve seat 18 adapted to receive a suitable valve, such as a ball 19 adapted to sink in ink. A pen point assembly 20 of any suitable well known construction providing a feed channel 21 is mounted in a finger grip 23 suitably secured upon the outer end of the inner cylinder 11. A suitable packing 25 is secured upon the inner end of the cylinder 11 and is adapted to form a seal between the cylinders 10 and 11. The packing 25 also provides a valve seat 27 adapted to receive a suitable valve, such as a ball 28. A by-pass 29 is provided in the packing 25 in the side thereof opposite the seat 27 to prevent the ball 19 closing communication between the chambers within the cylinders 10 and 11. Preferably, the ball 28 is hollow so as to float in ink. The pen point assembly 20 may be enclosed by the usual cap 30 threaded upon the cylinder 11 and provided with the usual air vents 31.

In filling the pen with ink, the cap 15 is removed and the end portion 12 inserted in an ink supply receptacle. The valve 28 drops against seat 27 to seal the chamber within cylinder 10. The cylinder 11 is then moved relative to the cylinder 10 in the direction shown by the arrow in Fig. 2 whereupon suction is created within the cylinder 10 causing ink to flow through the inlet openings 13 with sufficient force to raise the ball 19 and flow into the cylinder 10. This action continues until the packing 25 has been moved into engagement with the bushing 17 whereupon the cylinder 10 is completely filled with ink. The cylinder 11 is then moved in the opposite direction relative to the cylinder 10 as shown by the arrow in Fig. 3, the ball 19 engaging its seat 18 to close the inlet openings 13. As the cylinder 11 is moved into the cylinder 10, the ink in the latter flows into the former and the ball 28 floats and is finally forced into engagement with its valve seat 24, as indicated in Fig. 4, to close the feed channel 21. The cap 15 is then replaced and the pen is ready for use. When the pen is being used the ball 28 moves away from seat 24 permitting ink to flow through the feed channel 21.

If it is desired to clean the pen, the pen point assembly 20 is inserted in water and the cylinders 10 and 11 are moved relatively the same as when filling the pen with ink until the cylinders are extended as far as possible. The pen is then turned end to end a few times and the pen point assembly turned down over the water and the cylinders 10 and 11 pushed together to their closed positions.

The inlet openings 13 may be placed as near the tip of the end portion 12 as desired but preferably are positioned at points spaced slightly from the end thereof so as to avoid drawing in any sludge which may be in the bottom of the ink supply receptacle. The inlet openings 13 can be brought very close to the bottom of the ink supply receptacle making it possible to fill the pen conveniently even when the ink level in the supply receptacle is extremely low. The pen of the invention has no rubber sack to rot, leak, and need removal or to take up valuable ink reservoir space. Consequently, the pen has large ink capacity for any given size. After the pen is filled the cap 15 is replaced and the pen is ready for one's pocket or hand bag. The pen contains no complicated or delicate parts to wear out or get out of order and for this reason is durable and reliable.

I claim:

1. A fountain pen comprising hollow telescoping members providing an ink reservoir, a pen point mounted in the outer end of one of said members, the outer end of the other member having an ink inlet opening, a valve in said other member adapted to sink in the ink in said reservoir, and a valve seat for said valve adjacent said inlet opening.

2. A fountain pen comprising hollow telescoping members, a pen point mounted in the outer end of one of said members, the outer end of the other member having an ink inlet opening, valve means for controlling communication between said members including a valve adapted to float in ink and movable in the member carrying the pen point.

3. A fountain pen comprising hollow telescoping members, a pen point mounted in the outer end of one of said members, the outer end of the other member having an ink inlet opening, a valve in said other member adapted to sink in the ink in said reservoir, a valve seat for said valve adjacent said inlet opening, valve means for controlling communication between said cylinders including a valve adapted to float in ink and movable in the cylinder carrying the pen point.

4. A fountain pen comprising hollow telescoping members providing an ink reservoir, a pen point mounted in the outer end of one of said members, the other member having an ink inlet opening spaced from the outer end thereof, a valve in said other member adapted to sink in the ink in said reservoir and a valve seat for said valve adjacent said inlet opening.

In testimony whereof I affix my signature.

ADRIAN J. IORIO.